United States Patent
Koolen et al.

(10) Patent No.: US 11,148,540 B2
(45) Date of Patent: Oct. 19, 2021

(54) ADAPTIVE DC CHARGING CABLE LOSS COMPENSATION FOR EV CHARGING

(71) Applicant: ABB Schweiz AG, Baden (CH)

(72) Inventors: Gertjan Koolen, Eindhoven (NL); Stefan Raaijmakers, Delft (NL)

(73) Assignee: ABB SCHWEIZ AG, Baden (CH)

(*) Notice: Subject to any disclaimer, the term of this patent is extended or adjusted under 35 U.S.C. 154(b) by 101 days.

(21) Appl. No.: 16/558,835

(22) Filed: Sep. 3, 2019

(65) Prior Publication Data
US 2019/0381907 A1  Dec. 19, 2019

Related U.S. Application Data

(63) Continuation of application No. PCT/EP2018/055297, filed on Mar. 5, 2018.

(30) Foreign Application Priority Data

Mar. 3, 2017 (EP) .................................. 17159146

(51) Int. Cl.
*B60L 53/18* (2019.01)
*B60L 53/10* (2019.01)
(Continued)

(52) U.S. Cl.
CPC ............. *B60L 53/18* (2019.02); *B60L 53/11* (2019.02); *B60L 58/12* (2019.02); *H02J 7/007* (2013.01)

(58) Field of Classification Search
CPC .......... B60L 53/11; B60L 53/18; B60L 58/12; B60L 53/12; B60L 53/16; H02J 7/007; H02J 7/0027; H02J 7/0013; H02J 2310/48; Y02T 90/14; Y02T 10/70; Y02T 10/7072; H02M 3/33507
(Continued)

(56) References Cited

U.S. PATENT DOCUMENTS

2012/0253715 A1  10/2012  Ohtomo
2013/0069592 A1   3/2013  Bouman
(Continued)

FOREIGN PATENT DOCUMENTS

EP  2865558 A1  4/2015

OTHER PUBLICATIONS

European Patent Office, International Search Report & Written Opinion issued in corresponding Application No. PCT/EP2018/055297, dated Apr. 18, 2018, 12 pp.

*Primary Examiner* — Paul Dinh
(74) *Attorney, Agent, or Firm* — Greenberg Traurig, LLP (57) ABSTRACT

The invention relates to an electrical vehicle charging system for charging an electrical vehicle with DC energy, including a charger configured for delivering the DC energy, a DC charging cable having a first end and a second end, the first end is connected to the charger for receiving a DC voltage and the second end is configured for connecting the electrical vehicle, a DC voltage sensor configured, if a DC current greater zero flows from the charger to the electrical vehicle, for measuring at least a first DC voltage at the first end and for determining a differential DC voltage between the first DC voltage and a second DC voltage measured at the second end, and a DC voltage adjustment device configured for raising the DC voltage to compensate the differential DC voltage.

18 Claims, 3 Drawing Sheets

(51) Int. Cl.
*B60L 58/12* (2019.01)
*H02J 7/00* (2006.01)

(58) Field of Classification Search
USPC .......................................................... 320/109
See application file for complete search history.

(56) References Cited

U.S. PATENT DOCUMENTS

2013/0127415 A1\* 5/2013 Ohtomo ................. B60L 53/11
320/109
2016/0241068 A1\* 8/2016 Zhao ................. H02M 3/33507

\* cited by examiner

ADAPTIVE DC CHARGING CABLE LOSS COMPENSATION FOR EV CHARGING

TECHNICAL FIELD

The invention relates to an electrical vehicle charging system for charging an electrical vehicle with DC energy comprising a charger configured for delivering the DC energy, and a DC charging cable having a first and a second end, whereby the first end is connected to the charger for receiving a DC voltage and the second end is configured for connecting the electrical vehicle. The invention further relates to a method for compensating DC charging cable loss during charging an electrical vehicle with DC energy comprising the step of delivering DC energy by a DC charging cable from a charger to the electrical vehicle, whereby a first end of the DC charging cable is connected to the charger for receiving a DC voltage and the second end of the DC charging cable is connected to the electrical vehicle.

BACKGROUND ART

Electrical charging system for providing DC energy to charge a battery of an electrical vehicle are known from prior art. Said charging systems usually comprise a charger connected on an AC side to a power source such an AC grid and having a DC side for delivering the DC energy to the electrical vehicle. The DC side may comprise one or more charging ports each comprising an interface for energy exchange between the charger and the electrical vehicle via a DC charging cable. The charger may comprise a power transformer and/or a converter for converting AC energy towards the required DC energy. The charging ports are usually provided as normed socket-outlets or with a respective DC charging cable for connecting to electrical vehicle, for example according to IEC 62196, incorporating connector types of SAE J1772, known as Yazaki Connector in Novel America, VDE-AR-E2623-2-2, known as Mennekes Connector in Europe, EV Plug Alliance Proposal, known as Scame Connector in Italy, or JEVS G105-1993, known as CHEdeMO in Japan.

As a charging cable is characterized by a cable resistance, a voltage drop occurs between its first end connected to the charger and its second end connected to the electrical vehicle. In most situations such voltage drop is acceptable and can be neglected. However, in some situations, for example when charging electrical busses, long DC charging cables having a length of more than 50 or 100 metres are required. In such situations the voltage drop cannot be neglected anymore as it effects adversely the charging.

US 2013/127 415 A1 describes an electric charging system in which an electric charger and an electric vehicle are connected by a charging cable. The electric charger calculates a voltage drop amount in the charging cable on the basis of a supplied current at the electric charger side and an electric resistance of the charging cable.

US 2012/253 715 A1 describes an electric charger and an electric vehicle which is connected via a charging cable, and charging power is provided to a battery of the electric vehicle via the charging cable.

US 2013/069 592 A1 describes a charging system for electric vehicles, which includes at least one charging port with an interface for power exchange with at least one electric vehicle, and at least one power converter for converting power from a power source such as a power grid to a suitable format for charging the vehicle.

Prior art describes various solutions for compensating the voltage drop by increasing the DC voltage provided at the charger, based on the upfront known cable resistance. However, such solutions have been proven not to work reliably when using before described long DC charging cables with a length of more than 50 or 100 metres. One reason for not being reliable is that the cable resistance is determined upfront, for example during installation of the electrical vehicle charging system, and is thus error prone. Another reason for not being reliable is that the cable resistance depends on the temperature of the DC charging cable and contact resistance of connectors and contactors used for connecting the DC charging cable and switching on respectively off the DC energy in the charger.

SUMMARY OF INVENTION

It is therefore an object of the invention to provide a reliable system and method for compensating voltage drops occurred by a DC charging cable when charging an electrical vehicle.

The object of the invention is solved by the features of the independent claims. Preferred embodiments are detailed in the dependent claims.

Thus, the object is solved by an electrical vehicle charging system for charging an electrical vehicle with DC energy, comprising a charger configured for delivering the DC energy, a DC charging cable having a first end and a second end, whereby the first end is connected to the charger for receiving a DC voltage and the second end is configured for connecting the electrical vehicle, a DC voltage sensor configured, if a DC current greater zero flows from the charger to the electrical vehicle, for measuring at least a first DC voltage at the first end and for determining a differential DC voltage between the first DC voltage and a second DC voltage measured at the second end, and a DC voltage adjustment device configured for raising the DC voltage to compensate the differential DC voltage.

A key point of the invention is therefore to observe a voltage drop in the DC charging cable when the DC current flows and based on that actual determined voltage drop, i.e. on the differential DC voltage, to adjust the DC voltage applied by the charger onto the DC charging cable, thereby compensating the voltage drop. The DC voltage adjustment device is preferably configured for raising the DC voltage to fully compensate the differential DC voltage and/or to raise the DC voltage until the differential DC voltage is compensated.

Thus, contrary to prior art solutions, the system does not consider an upfront resistance of the DC charging cable, for example measured during installation or manufacturing of the DC charging cable, but rather determines the actual differential DC voltage while the DC charging cable is being used for charging the electrical vehicle and thus applied with the DC current. Therefore, the proposed system is muss less error prone than said prior art solutions. In addition, the proposed system also operates independently from a temperature of the DC charging cable, of contact resistances and/or of contactors used within the charger. In sum, the proposed system provides for a much more efficient and accurate compensation of cable losses, which is especially advantageous while using long DC charging cable for charging electrical busses or the like.

The charger is preferably provided as a DC charger with, for example, 50 kW DC fast charging capability thus allowing in typical charging of 30 to 80% in 15 minutes at an output voltage of 200-500 Vat 125 A (Combo-1) or 50-500

V at 120 A (CHAdeMO) and/or may fulfil IEC 62196/EN 61851-23 connection standards. The charger may comprise a socket-outlet according to SAE J1772, VDE-AR-E2623-2-2, EV Plug Alliance Proposal and/or JEV SG105-1993 connection standards such that respective connectors or plugs can be plugged into the charger. In an analogous manner, the DC charging cable may also fulfil said norms and is preferably equipped with the plug at a first end and/or at a second end for plugging the DC charging cable into the charger respectively into the electrical vehicle. While such socket-outlet or a plurality of socket-outlets can be provided in a casing of the charger, it is also possible to provide a charging port for connecting the DC charging cable distant to the charger, which preferably provides DC energy to a plurality of said charging ports.

The connector or plugs can be designed for automated connection, preferably automatically identifying presence of a mating connector and also automatically performing an electrical connection when two mating members are less than a given distance apart. A pantograph installed at a top of an ebus may connect to the second end of the DC charging cable for charging the ebus. In such way connectors and/or socket outlets may not be used for connecting the DC charging cable to the charger and to the pantograph. Measuring the voltage can be done near the first end and/or the end of the DC charging cable, at the first end and/or the end of the DC charging cable, on contacts of the plug at the first end and/or the end, on the contacts of the electrical vehicle socket or even within the electrical vehicle.

The charger may comprise a power transformer and/or a power converter for connecting to an AC grid on an AC side and providing the DC energy on a DC side for respectively charging the electrical vehicle. The DC charging cable is preferably also provided compliant to IEC 62196 standard and comprises, for example, a first line for conducting a positive potential and a second line for conducting a negative potential. The voltage adjustment device may comprise a computerized controller, a programmable logic control or a similar means, which, depending on the differential voltage, controls raising the DC voltage at the charger. The electrical vehicle can be provided as any electrical vehicle known from prior art, for example as an electrical bus, ebus and/or comprises a battery to be charged when connecting the DC charging cable to the electrical vehicle. The DC voltage adjustment device and the DC voltage sensor may be provided as separate devices, but can also be provided as single, joint device.

Measuring the first DC voltage and/or the second DC voltage can be done, for example by using a voltmeter or similar means known from prior art. Measuring the first DC voltage can be done at a charging port at the charger to which the DC charging cable is inserted with its first end. The differential DC voltage is preferably determined by calculating the difference between a first DC voltage and a second DC voltage, for example by subtracting the second DC voltage from the first DC voltage.

In a preferred embodiment the DC voltage sensor is configured, if the DC current greater zero flows from the charger to the electrical vehicle, for measuring the second DC voltage at the second end. In this way, a single DC voltage sensor is sufficient for measuring both the first DC voltage and a second DC voltage. The term DC current greater zero should be understood as that the electrical vehicle is being charged in that moment with DC energy, thus resulting in the DC current flow from the charger to the electrical vehicle.

According to another, alternative embodiment the system comprises a second DC voltage sensor configured, if the DC current greater zero flows from the charger to the electrical vehicle, for measuring the second DC voltage at the second end. In such way two DC voltage sensors are provided, being installed respectively associated one to the first end and another to the second end, resulting in a more precise measurement of the first DC voltage and second DC voltage respectively more precise determination of the differential DC voltage. The second DC voltage sensor is preferably attached to the second end of the DC charging cable.

According to a further preferred embodiment the DC charging cable comprises a signal line configured for transmitting the measured second DC voltage from the second end to the first end and/or the DC charging cable comprises a length between the first end and the second end of ≥50, 100 or 200 meters. Preferably, the signal line is provided as a control pilot, CP, line and/or proximity pilot, PP, line according to IEC 61851. The DC charging cable may also comprise a protective earth, PE, line connected to protective earth at the charger. Most preferably, the measured second DC voltage is digitally communicated from the second end to the first end, for example from the second DC voltage sensor to the first voltage sensor for determining the differential DC voltage.

Generally, various possibilities exist for the DC voltage adjustment device to compensate the differential DC voltage, in particular by increasing the DC voltage applied for the charger to the DC charging cable by the differential DC voltage. However, according to an especially preferred embodiment the DC voltage adjustment device is configured for determining, based on the differential DC voltage and the DC current, a DC charging cable resistance, for determining, based on the DC charging cable resistance and a DC current, a predicted differential DC voltage, and for raising the DC voltage by the predicted differential DC voltage. Thus, the DC charging cable resistance is determining in the specific moment when the DC charging cable is applied with the DC current for charging the electrical vehicle. Based on the determined DC charging cable resistance and the actual DC current, a predicted differential DC voltage is determined as prediction from expected DC current.

A further advantage of such feed-forward approach with a determined DC cable resistance is that a bandwidth of the DC voltage measurement at the second end i.e. of the second DC voltage sensor arranged at an electrical vehicle side can be lower, without sacrificing performance. In case of multiple outlets on the same charger, the use of multiple DC voltage measurements i.e. multiple second DC voltage sensors at the electrical vehicle side and a single voltage measurement with the first DC voltage sensor on the DC charger side results in multiple measured DC charging cable resistances. These multiple measured DC charging cable resistances can be used to compensate for each DC charging cable individually and can be compared with each other to see if one of the second DC voltage sensors, contactors and/or electrical connections is wearing out quicker than the other second DC voltage sensors, other contactors and/or other electrical connections. In general, the DC cable resistance can be followed over the lifetime of the charger in order to detect, predict and/or profile when the system is going to fail, and plan maintenance in time to prevent down-time. The determined DC cable resistance can be analysed over a plurality of chargers to derive a predictive model.

When charging an electrical vehicle, the DC charging current is not constant over time and rather changes between the beginning and end of the charging. The present embodiment adapts to this change by determining said predicted differential DC voltage. Based on said predicted differential DC voltage the DC voltage is raised for compensating the cable loss due to the length and resistance of the DC charging cable. Determining the DC charging cable resistance and/or the predicted differential DC voltage is preferably done by, for example, dividing the differential DC voltage by the DC current and/or by a calculation. Determining the predicted differential DC voltage can also be done by using a stochastic or other mathematical model for predicting the DC current and its changes over the charging time.

According to a further embodiment it is in this regard preferred that the DC voltage adjustment device is configured for low pass filtering the determined DC charging cable resistance prior to determining the predicted differential DC voltage. Low pass filtering is advantageous for ensuring that adjusting the DC voltage does not interfere with an existing control regulation of the charger. The low pass filter may be provided as an RC filter comprising a resistor and a capacitor.

In this regard it is according to a further embodiment preferred that the charger comprises a closed control loop configured for compensating stray inductances and/or capacitances of the DC charging cable and/or of the electrical vehicle, preferably provided as the before-mentioned control regulation, with a response time of $\geq 0.01$ seconds and $\leq 0.5$ seconds and the DC voltage adjustment device is configured for low pass filtering 10 times slower compared thereto and/or the DC voltage adjustment device is configured for first order low pass filtering with a time constant of the low pass filter of $\tau \geq 5$ seconds. The closed control loop is preferably provided to avoid instability issues resulting from said stray inductances and/or capacitances. Providing such low pass filter being more than ten times lower than the control regulation of the charger has been proven especially reliable and precise for compensating the cable loss in the DC charging cable.

It was described earlier that the voltage sensor is configured to measure the first DC voltage if the DC current is greater zero, i.e. flows from the charger to the electrical vehicle. According to a further embodiment it is preferred that the DC voltage sensor is configured, if the DC current is greater than a predefined threshold to measure the at least first DC voltage. In this regard it is preferred that the DC voltage sensor is configured, if a DC current, greater than a maximum deviation of the differential DC voltage due to noise and/or interference divided by a maximum deviation of the DC charging cable resistant, flows from the charger to electrical vehicle, to measure at least a first DC voltage. Thereby, the maximum deviation of the DC charging cable resistance is preferably equal to an allowed error that is acceptable from the determination respectively calculation of the differential DC voltage. With this embodiment instability issues can be avoided due to unknown stray inductances respectively capacitances of the DC charging cable and the electrical vehicle.

According to another embodiment the DC voltage adjustment device is configured, if the DC charging cable resistance exceeds a predefined threshold, to interrupt the delivery of DC energy to the electrical vehicle. Preferably, if the DC charging cable resistance has exceeded the predefined threshold, an operator of the system is notified and/or an error message is transmitted to an alarming system. The threshold can be defined, for example, as twice an expected typical resistance of the DC charging cable. In this way charging and/or cable problems can be determined easily in an early stage of the charging session and breakdown of the system is avoided due to interrupting the delivery of the DC energy provision to the electrical vehicle. Interrupting the delivery of DC energy can be done, for example, by switching of a contactor provided in the charger regulating energy flow to the electrical vehicle and/or by disconnecting the charger from an AC grid or a power converter.

The object of the invention is further solved by a method for compensating DC charging cable loss during charging an electrical vehicle with DC energy comprising the steps of delivering the DC energy by the DC charging cable from a charger to the electrical vehicle, whereby a first end of the DC charging cable is connected to the charger for receiving a DC voltage and a second end of the DC charging cable is connected to the electrical vehicle, measuring, if a DC current greater zero flows from the charger to the electrical vehicle, a first DC voltage at the first end and a second DC voltage at the second end, determining a differential DC voltage from the first DC voltage and the second DC voltage, and raising the DC voltage to compensate the differential DC voltage.

Compared to prior art solutions the method allows for a much easier and more precise compensation of the DC charging cable losses, as the DC voltage is raised not based on an upfront determined cable resistance but rather on the differential DC voltage measured during charging between the first end and the second end of the DC charging cable. It is preferred that the DC voltage is raised until the differential DC voltage is fully compensated.

According to a preferred embodiment the method comprises the step of transmitting the measured second DC voltage from the second end via a signal line of the DC charging cable to the first end and/or whereby the DC charging cable comprises a length between the first end and the second end of $\geq 50$, 100 or 200 meters.

According to further preferred embodiment the method comprises the steps of determining, based on the differential DC voltage and the DC current, a DC charging cable resistance, determining, based on the DC charging cable resistance and the DC current, a predicted differential DC voltage, and raising the DC voltage by the predicted differential DC voltage. Preferably the step of determining comprises the step of calculating, for example by dividing the DC voltage with the DC current for receiving the DC charging cable resistance. The predicted differential DC voltage is preferably determined by using a stochastical and/or mathematical function for ensuring that an expected, future DC current is considered when raising the DC voltage for compensating the DC charging cable loss.

In another preferred embodiment the method comprises the step of low pass filtering the determined DC charging cable resistance prior to determining the predicted differential DC voltage. In an even further preferred embodiment the charger comprises a closed control loop configured for compensating stray inductances and/or capacitances of the DC charging cable and/or of the electrical vehicle with a response time of $\geq 0.01$ seconds and $\leq 0.5$ seconds and the low pass filtering is $\geq 10$ times slower compared thereto and/or the low pass filtering comprises a first order low pass filter with a time constant of $\tau \geq 5$ seconds.

In another preferred embodiment the method comprises the step of interrupting the delivery of DC energy to the electrical vehicle if the DC charging cable resistance has exceeded a predefined threshold.

Further embodiments and advantages of the method are directly and unambiguously derived by the person skilled in the art from the system as described above.

BRIEF DESCRIPTION OF DRAWINGS

These and other aspects of the invention will be apparent from and elucidated with reference to the embodiments described hereinafter.

In the drawings.

DESCRIPTION OF EMBODIMENTS

Figure 1:
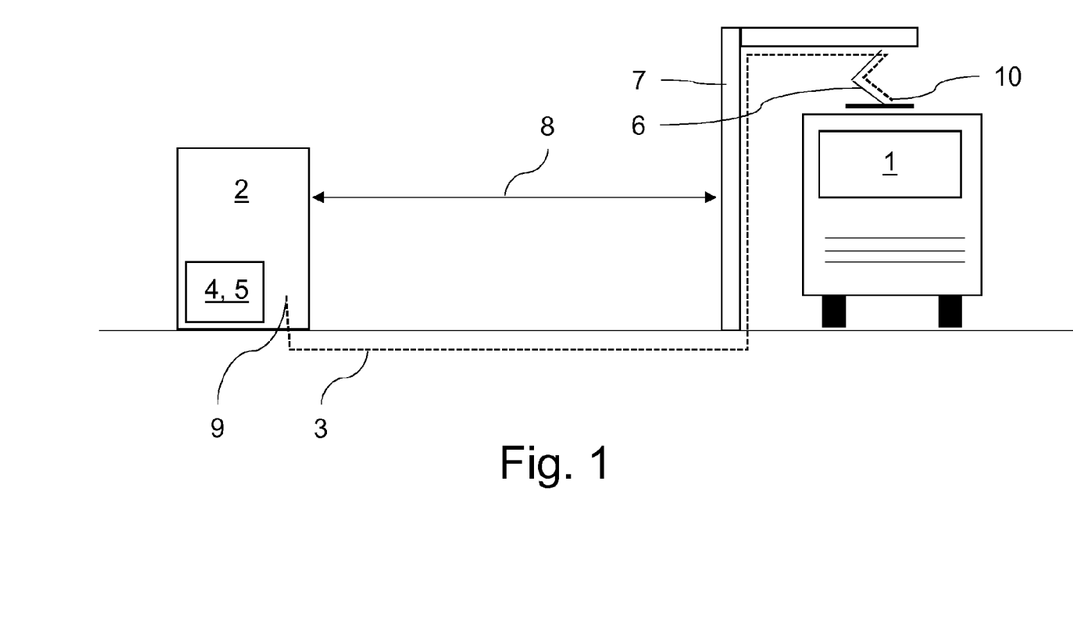
FIG. 1 shows an electrical vehicle charging system according to a preferred embodiment of the invention in a schematic view.
Figure 2:
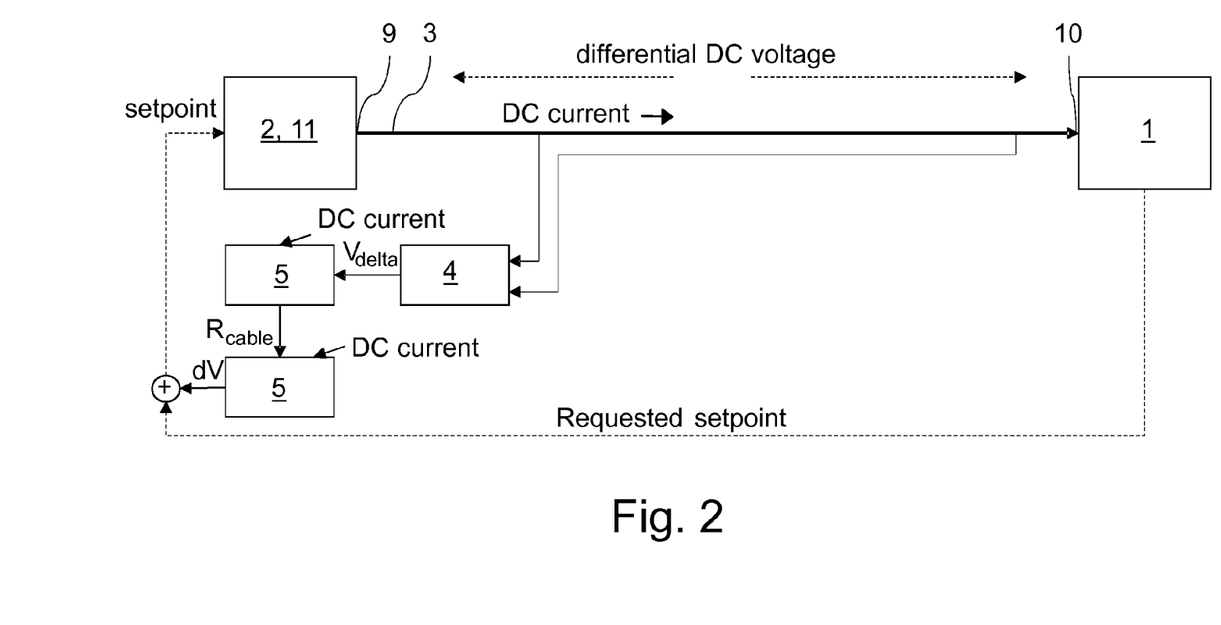
FIG. 2 shows the electrical vehicle charging system according to FIG. 1 as a schematic circuit diagram.

FIG. 1 shows an electrical vehicle charging system for charging an electrical vehicle 1 with DC energy in a schematic view. FIG. 2 shows the electrical vehicle charging system according to FIG. 1 as a schematic circuit diagram and FIG. 2 shows a further embodiment of the electrical vehicle charging system of FIG. 1 as a schematic circuit diagram.

Figure 3:
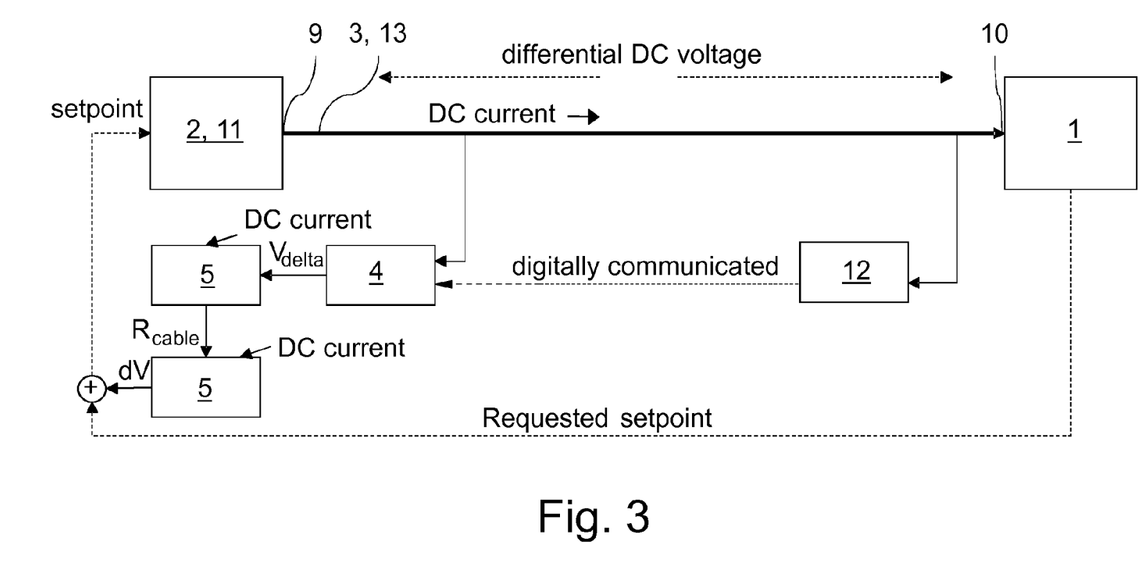
FIG. 3 shows the electrical vehicle charging system according to a further preferred embodiment as a schematic circuit diagram.

The electrical vehicle charging system comprises a charger 2, a DC charging cable 3, a DC voltage sensor 4, as can be seen from FIG. 2 and FIG. 3, and a DC voltage adjustment device 5. As can be seen from FIG. 1, the electrical vehicle 1 is provided as an electrical bus, which is electrically connected via its pantograph 6 to the DC charging cable 3 at an electric filling station 7. Distant to the electric filling station 7, marked with an arrow 8, the charger 2 is installed. In the present embodiment the distance between the electric filling station 7 and the charger 2 is more than 80 meters such that a length of the DC charging cable 3 between its first end 9 being connected to the charger 2 and its second end 10 being connected to the electrical vehicle 1 is more than 100 meters.

The charger 2 is electrically connected, not shown, to an AC grid for receiving AC energy from the AC grid. The charger 2 further comprises a power transformer receiving the AC energy, not shown, and a power converter, also not shown, converting the AC energy to a suitable format for providing the DC energy for charging the electrical vehicle 1.

If the electrical vehicle 1 is being charged with the DC energy, a respective DC current greater zero flows from the charger 2 to the electrical vehicle 1. In such case the DC voltage sensor 4 measures a first DC voltage at the first end 9 and, as can be seen from FIG. 2, a second DC voltage at the second end 2. The DC voltage sensor 4 then determines a differential DC voltage by subtracting the second DC voltage from the first DC voltage thereby receiving a voltage drop respectively loss of the DC charging cable between the first end 9 and the second end 10. Based on the so determined differential DC voltage, the DC voltage adjustment device 5 raises the DC voltage applied from the charger 2 onto the DC charging cable 3 for compensating the differential DC voltage. The DC voltage sensor 4 and the DC voltage adjustment device 5 can be provided as a single device carrying out the described steps or as separate devices interacting with each other.

FIG. 2 shows the respective schematic circuit diagram for the embodiment shown in FIG. 1. At the beginning of a charging session the electrical vehicle 1 requests setting of a setpoint at the charger 2 respectively requests the provision of DC energy according to preferences of the electrical vehicle 1. The charger 2 then delivers the DC energy according to the setpoint by applying a respective DC voltage onto the DC charging cable 3. As described before, during the charging session, the DC voltage sensor 4 measures the first DC voltage at the first end 9 and the second DC voltage at the second end 10 and determines the differential DC voltage, named Vdelta in FIG. 2.

Thereafter, the DC voltage adjustment device 5 first determines an actual DC charging cable resistance of the DC charging cable 3, named $R_{cable}$ in FIG. 2, based on the determined differential DC voltage and the actual DC current flowing from the charger 2 to the electrical vehicle 1. Next, the DC voltage adjustment device 5 determines a predicted differential DC voltage, named dV in FIG. 2, based on the determined DC charging cable resistance and the DC current. Typically, the DC current changes during beginning and end of a charging session. Thus, the predicted differential DC voltage is determined by using a stochastic and/or mathematical model for ensuring that a future differential DC voltage is considered when amending the setpoint at the charger 2 based on the determined predicted differential DC voltage. As a consequence, the DC voltage applied by the charger 2 onto the DC charging cable 3 is raised by the predicted differential DC voltage to compensate the DC charging cable 3 loss.

In order to improve the compensation, the determined DC charging cable resistance is low pass filtered prior to determining the predicted differential DC voltage. The low pass filter of the DC voltage adjustment device 5 is more than ten times slower than a closed control loop 11 of the charger 2, which compensates stray inductances and/or capacitances of the DC charging cable 3 and the electrical vehicle 1 occurring during the charging session. Therefore, the low pass filter has a time constant $\tau$ of more than 5 seconds.

FIG. 3 shows a further embodiment, which, different to the embodiment shown in FIG. 2, comprises a second DC voltage sensor 12 which is arranged and connected at the second end 10 of the DC charging cable 3. The DC charging cable 3 comprises a signal line 14, for example a control pilot, CP line, which digitally transmits the measured second DC voltage from the second DC voltage sensor 12 to the first voltage sensor 4.

The DC voltage adjustment device 5 is further configured to interrupt delivery of DC energy to the electrical vehicle 1 if a DC charging cable resistance is determined that exceeds a predefined threshold such as twice an expected typical resistance of the DC charging cable 3. Interrupting the delivery can be done by switching of a contactor of the charger 2 or by disconnecting the charger 2 from the AC grid. In such case charging is stopped and/or a maintenance of the charging system can be requested.

The described system and the respective method provide a reliable solution for compensating a voltage drop on long DC charging cables 3 used for example when charging electrical busses as electrical vehicles 1 by adapting to different DC currents present during such charging session. Thus, the described solution works independent from a temperature of the DC charging cable 3, contact resistances of contactors used in the charger 2 and is much less error prone than prior art solutions compensating cable losses based on upfront determined cable resistances.

While the invention has been illustrated and described in detail in the drawings and foregoing description, such illustration and description are to be considered illustrative or exemplary and not restrictive; the invention is not limited to the disclosed embodiments. Other variations to be disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting scope.

REFERENCE SIGNS LIST 1 electrical vehicle
2 charger
3 DC charging cable
4 first DC voltage sensor
5 DC voltage adjustment device
6 pantograph
7 electric filling station
8 arrow
9 first end
10 second end
11 closed control loop
12 second DC voltage sensor
13 signal line

The invention claimed is:

1. An electrical vehicle charging system for charging an electrical vehicle with DC energy, comprising
a charger configured for delivering the DC energy,
a DC charging cable having a first end and a second end, the first end is connected to the charger for receiving a DC voltage and the second end is configured for connecting the electrical vehicle,
a DC voltage sensor configured, if a DC current greater zero flows from the charger to the electrical vehicle, for measuring at least a first DC voltage at the first end and for determining a differential DC voltage between the first DC voltage and a second DC voltage measured at the second end, and
a DC voltage adjustment device configured for raising the DC voltage by the differential DC voltage to compensate the differential DC voltage,
wherein the DC voltage adjustment device is configured for determining, based on the differential DC voltage and the DC current, a DC charging cable resistance, for determining, based on the DC charging cable resistance and the DC current, a predicted differential DC voltage, and for raising the DC voltage by the predicted differential DC voltage, and
wherein the DC voltage sensor is configured, if a DC current greater than a maximum deviation of the differential DC voltage due to noise and/or interference divided by a maximum deviation of the DC charging cable resistance flows from the charger to the electrical vehicle, for measuring at least the first DC voltage.

2. The electrical vehicle charging system according to claim 1, wherein the DC voltage sensor is configured, if the DC current greater zero flows from the charger to the electrical vehicle, for measuring the second DC voltage at the second end.

3. The electrical vehicle charging system according to claim 2, comprising a second DC voltage sensor configured, if the DC current greater zero flows from the charger to the electrical vehicle, for measuring the second DC voltage at the second end;
wherein the DC charging cable comprises a signal line configured for transmitting the measured second DC voltage from the second end to the first end and/or the DC charging cable comprises a length between the first end and the second end of ≥50 meters;
wherein the DC voltage adjustment device is configured for determining, based on the differential DC voltage and the DC current, a DC charging cable resistance, for determining, based on the DC charging cable resistance and the DC current, a predicted differential DC voltage, and for raising the DC voltage by the predicted differential DC voltage; and
wherein the DC voltage adjustment device is configured for low pass filtering the determined DC charging cable resistance prior to determining the predicted differential DC voltage.

4. The electrical vehicle charging system according to claim 1, comprising a second DC voltage sensor configured, if the DC current greater zero flows from the charger to the electrical vehicle, for measuring the second DC voltage at the second end.

5. The electrical vehicle charging system according to claim 1, wherein the DC charging cable comprises a signal line configured for transmitting the measured second DC voltage from the second end to the first end and/or the DC charging cable comprises a length between the first end and the second end of ≥50, 100 or 200 meters.

6. The electrical charging system according to claim 1, wherein the DC voltage adjustment device is configured for low pass filtering the determined DC charging cable resistance prior to determining the predicted differential DC voltage.

7. The electrical vehicle charging system according to claim 6, wherein the charger comprises a closed control loop configured for compensating stray inductances and/or capacitances of the DC charging cable and/or of the electrical vehicle with a response time of ≥0.01 seconds and ≤0.5 seconds and the DC voltage adjustment device is configured for low pass filtering ≥10 times slower compared thereto and/or the DC voltage adjustment device is configured for first order low pass filtering with a time constant of the low pass filter of τ≥seconds.

8. The electrical vehicle charging system according to claim 6, wherein the DC voltage sensor configured, if a DC current greater than a maximum deviation of the differential DC voltage due to noise and/or interference divided by a maximum deviation of the DC charging cable resistance flows from the charger to the electrical vehicle for measuring at least the first DC voltage.

9. The electrical vehicle charging system according to claim 6, wherein the DC voltage adjustment device is configured, if the DC charging cable resistance exceeds a predefined threshold, to interrupt the delivery of DC energy to the electrical vehicle.

10. The electrical vehicle charging system according to any of claim 1, wherein the DC voltage adjustment device is configured, if the DC charging cable resistance exceeds a predefined threshold, to interrupt the delivery of DC energy to the electrical vehicle.

11. The electrical vehicle charging system according to claim 1, wherein the DC voltage adjustment device is configured, if the DC charging cable resistance exceeds a predefined threshold, to interrupt the delivery of DC energy to the electrical vehicle.

12. A method for compensating DC charging cable loss during charging an electrical vehicle with DC energy, the method comprising the steps of:
  delivering the DC energy by the DC charging cable from a charger to the electrical vehicle, wherein a first end of the DC charging cable is connected to the charger for receiving a DC voltage and a second end of the DC charging cable is connected to the electrical vehicle,
  measuring, if a DC current greater zero flows from the charger to the electrical vehicle, a first DC voltage at the first end and a second DC voltage at the second end,
  determining a differential DC voltage from the first DC voltage and the second DC voltage, wherein said measuring comprises if a DC current greater than a maximum deviation of the differential DC voltage due to noise and/or interference divided by a maximum deviation of a DC charging cable resistance flows from the charger to the electrical vehicle, for measuring at least the first DC voltage, and
  raising the DC voltage by the differential DC voltage to compensate the differential DC voltage, the raising is determined, based on the differential DC voltage and the DC current, a DC charging cable resistance, for determining, based on a DC charging cable resistance and the DC current, a predicted differential DC voltage, and for raising the DC voltage by a predicted differential DC voltage.

13. The method according to claim 12, comprising the step of
  transmitting the measured second DC voltage from the second end via a signal line of the DC charging cable to the first end and/or wherein
  the DC charging cable comprises a length between the first end and the second end ≥50.

14. The method according to claim 12, comprising the steps of
  determining, based on the differential DC voltage and the DC current, a DC charging cable resistance,
  determining, based on the DC charging cable resistance and the DC current a predicted differential DC voltage, and
  raising the DC voltage by the predicted differential DC voltage.

15. The method according to claim 14, comprising the step of low pass filtering the determined DC charging cable resistance prior to determining the predicted differential DC voltage.

16. The method according to claim 12, wherein the charger comprises a closed control loop configured for compensating stray inductances and/or capacitances of the DC charging cable and/or of the electrical vehicle with a response time of ≥0.01 seconds and ≤0.5 seconds and the low pass filtering is ≥10 times slower compared thereto and/or the low pass filtering comprises a first order low pass filter with a time constant of $\tau \geq 5$ seconds.

17. The method according to claim 14, comprising the step of
  if the DC charging cable resistance has exceeded a predefined threshold, interrupt the delivery of DC energy to the electrical vehicle.

18. An electrical vehicle charging system for charging an electrical vehicle with DC energy, comprising
  a charger configured for delivering the DC energy,
  a DC charging cable having a first end and a second end, the first end is connected to the charger for receiving a DC voltage and the second end is configured for connecting the electrical vehicle,
  a DC voltage sensor configured, if a DC current greater zero flows from the charger to the electrical vehicle, for measuring at least a first DC voltage at the first end and for determining a differential DC voltage between the first DC voltage and a second DC voltage measured at the second end, and wherein the DC voltage sensor is configured, if the DC current greater zero flows from the charger to the electrical vehicle, for measuring the second DC voltage at the second end, and
  a DC voltage adjustment device configured for raising the DC voltage by the differential DC voltage to compensate the differential DC voltage, and
  a second DC voltage sensor configured, if the DC current greater zero flows from the charger to the electrical vehicle, for measuring the second DC voltage at the second end; and
  wherein the DC charging cable comprises a signal line configured for transmitting the measured second DC voltage from the second end to the first end and/or the DC charging cable comprises a length between the first end and the second end of ≥50 meters.

* * * * *